United States Patent [19]

Chromecek et al.

[11] 4,276,402

[45] Jun. 30, 1981

[54] POLYSILOXANE/ACRYLIC ACID/POLCYCLIC ESTERS OF METHACRYLIC ACID POLYMER CONTACT LENS

[75] Inventors: Richard C. Chromecek; William G. Deichert, both of Macedon; Joseph J. Falcetta, Pittsford, all of N.Y.; Martin F. VanBuren, Chelmsford, Mass.

[73] Assignee: Bausch & Lomb Incorporated, Rochester, N.Y.

[21] Appl. No.: 75,365

[22] Filed: Sep. 13, 1979

[51] Int. Cl.³ .............................................. C08F 30/08
[52] U.S. Cl. ........................... 526/264; 204/159.13; 204/159.23; 204/159.24; 351/160 R; 351/160 H; 526/270; 526/279; 528/23; 528/24; 528/33; 528/26; 528/32; 556/416; 556/417; 556/418; 556/419; 556/440
[58] Field of Search ................ 526/279, 264, 270; 528/23, 24, 32, 33, 26; 351/160 R, 160 H; 204/159.13, 159.23, 159.24; 556/416, 417, 418, 419, 440

[56] References Cited

U.S. PATENT DOCUMENTS

| | | | |
|---|---|---|---|
| 2,770,633 | 11/1956 | Sommer | 260/448.2 |
| 2,793,223 | 5/1957 | Merker | 260/448.2 |
| 2,865,885 | 12/1958 | de Benneville et al. | 260/46.5 |
| 2,906,735 | 9/1959 | Speier | 260/46.5 |
| 2,922,807 | 1/1960 | Merker | 260/448.2 |
| 3,041,362 | 6/1962 | Merker | 260/448.2 |
| 3,041,363 | 6/1962 | Merker et al. | 260/448.2 |
| 3,228,741 | 1/1966 | Becker | 351/160 |
| 3,341,490 | 9/1967 | Burdich et al. | 260/37 |
| 3,518,324 | 6/1970 | Polmanteer | 260/825 |
| 3,763,081 | 10/1973 | Holub et al. | 260/37 |
| 3,808,178 | 4/1974 | Gaylord | 260/86.1 |
| 3,878,263 | 4/1975 | Martin | 260/825 |
| 3,996,187 | 12/1976 | Travnicek | 260/37 |
| 3,996,189 | 12/1976 | Travnicek | 260/37 |
| 4,136,250 | 1/1979 | Mueller et al. | 528/29 |
| 4,138,382 | 2/1979 | Polmanteer | 260/29.6 |
| 4,153,641 | 5/1979 | Deichert et al. | 260/827 |

FOREIGN PATENT DOCUMENTS 7704136  4/1977  Netherlands .

OTHER PUBLICATIONS

Merker et al., J. Polymer Sci., vol. 43, pp. 297–310 (1960).
Bostick, Chapter 8, pp. 343–357, Kinetics and Mechanisms of Polymerization (1969).
Bostick, vol. 19, (1964), p. 525, Chemical Reactions of Polymers, Chapter 7.
Katz et al., J. Polymer Sci., vol. 46, pp. 139–148 (1974).
Katz et al., J. Polymer Sci., vol. 13, pp. 645–658 (1975).
Katz et al., J. Polymer Sci., vol. 16, pp. 597–614 (1978).
Piccoli, J. Am. Chem. Soc., vol. 82, pp. 1883–1885 (1960).

*Primary Examiner*—Melvyn I. Marquis
*Attorney, Agent, or Firm*—Robert M. Phipps; Frank C. Parker

[57] ABSTRACT

Monomeric polysiloxanes end-capped with activated unsaturated groups polymerized with acrylic acid and a comonomer comprising a polycyclic ester of acrylic acid or methacrylic acid to form a hydrophilic, water absorbing contact lens is disclosed. These polysiloxane polymer contact lenses are unexpectedly capable upon hydration of retaining from 1 percent to about 99 percent by weight of water, based upon the total weight of the dry, i.e., unhydrated polymer.

31 Claims, No Drawings

POLYSILOXANE/ACRYLIC ACID/POLCYCLIC ESTERS OF METHACRYLIC ACID POLYMER CONTACT LENS

BACKGROUND OF THE INVENTION

1. Field of the Invention

It was discovered that the hydrophobic properties of certain polysiloxanes could be altered through polymerization to form polymers which unexpectedly possessed hydrophilic properties sufficiently that when the polymers were saturated with water the polymers would retain from about 1 percent to about 99 percent by weight of water, based on the total weight of the unhydrated polymer.

These contact lenses are hydrophilic, water absorbing, flexible, fillerless, hydrolytically stable, biologically inert, contact lenses with the capability of transporting oxygen sufficiently to meet the requirements of the human cornea. These lenses comprise a polysiloxane monomer $\alpha,\omega$ terminally bonded through divalent hydrocarbon groups to polymerizable, free radical polymerizably activated, unsaturated groups polymerized with acrylic acid and a polycyclic ester of acrylic acid or methacrylic acid forming a polymer in a crosslinked network capable upon saturation with water of retaining from about 1 percent to about 99 percent by weight of water, based on the total weight of the unhydrated polymer.

PRIOR ART STATEMENT

U.S. Pat. No. 4,153,641 teaches contact lenses made from polymers and copolymers comprising poly(organosiloxane) polymers and copolymers formed by polymerizing a poly(organosiloxane) monomer $\alpha,\omega$ terminally bonded through divalent hydrocarbon groups to polymerizable, free radical polymerizably activated, unsaturated groups forming a polymer in a crosslinked network. Additionally, specific comonomers are disclosed which include lower esters of acrylic and methacrylic acid, styryls and N-vinyl pyrrolidinone which may be copolymerized with the above described poly(organosiloxane) monomer to form a copolymer. The instant invention utilizes the same poly(organosiloxane) monomers described above. However, it was discovered that when the polysiloxane monomers described above were polymerized with acrylic acid and a monomer comprising a polycyclic ester of acrylic acid or methacrylic acid, a hydrophilic, water absorbing polymer with unexpectedly high tensile strength and tear strength was formed which was extremely suitable for making soft contact lenses. As is generally known in the siloxane art, siloxanes are generally hydrophobic. However, there are a few polysiloxanes which are purported to be hydrophilic. We know of only one instance in addition the instant invention, where a polysiloxane is disclosed which is capable of absorbing water. However, this known material, as disclosed in U.S. Pat. No. 4,136,250, would not be suitable for making the instant contact lens for the reasons stated herein concerning U.S. Pat. No. 4,136,250 as prior art. As mentioned, unexpectedly it was discovered that when the above described polysiloxane monomers were polymerized with acrylic acid and a monomer comprising a polycyclic ester of acrylic acid or methacrylic acid that not only was the resulting polymer hydrophilic but when the polymer was saturated with water this polymer unexpectedly absorbed from about 1 percent to about 99 percent by weight of water, based on the total weight of the dry polymer.

U.S. Pat. No. 4,136,250 teaches in pertinent part, a water absorbing polysiloxane which may be used to make soft contact lenses which is obtained by copolymerizing the following siloxane monomer:

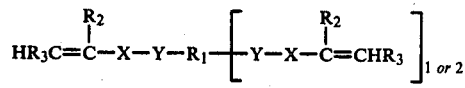

in which $R_1$ can be

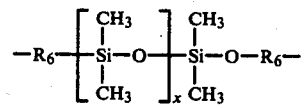

with a variety of hydrophilic monomers including acrylic acid. The above siloxane monomers can be reduced to a formula similar to but yet critically different from the instant polyorganosiloxane monomers. From the pertinent teachings of U.S. Pat. No. 4,136,250 the following siloxane monomer may be derived:

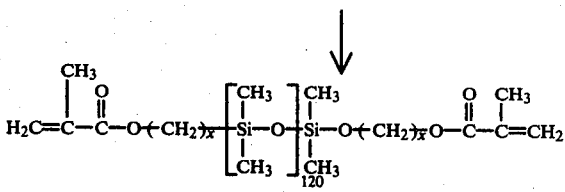

The oxygen atom in the monomer backbone with the arrow pointing to it is present in the '250 formula but not present in the instant polyorganosiloxane monomers. This oxygen atom presents several problems. This particular oxygen atoms, because of its placement between the silicone and carbon atoms, is subject to hydrolysis and alcoholysis. This stability is important if this material is to be used for biomedical devices, such as contact lenses, since these types of devices are usually heated in order to disinfect them. If during heating the contact lens loses its shape, then it loses its optics. This means that the material taught in '250 would be undesirable for use in certain medical devices including contact lenses. The instant polyorganosiloxane monomers result in copolymers which have superior hydrolytic stability since there is no Si—O—C linkage.

Also to be considered are the examples of '250. Only in these examples of '250 are there specific monomers disclosed without this undesirable Si—O—C linkage. However, these specific monomers have undesirable urethane linkages or couplings which present structures which are even more different from the instant monomers. The urethane linkage, i.e.,

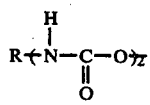

is as mentioned, also undesirable for use in medical devices, particularly contact lenses. However, in addition, the instant polyorganosiloxane monomers have no urethane linkages.

U.S. Pat. No. 4,138,382, teaches, in pertinent part, a hydrophilic, water swellable crosslinked copolymer gel. This copolymer gel is a hydrogel, such as N-vinyl-pyrrolidone crosslinked with a low molecular weight siloxane. The siloxane component is a very small constituent and is present for the purpose of crosslinking. The siloxane is not present in amounts more than about 2 percent by weight. U.S. Pat. No. 4,138,382 does not teach a hydrophilic, water absorbing siloxane, much less, a contact lens made therefrom.

Dutch Pat. No. 7,704,136 published Oct. 18, 1977, teaches, in pertinent part, a wettable siloxane material for use in making contact lenses. However, '136 teaches that the wettable contact lenses should not absorb water since water absorption as taught in '136, would cause water to be discharged into the eye when the contact lenses are in use. This is viewed as a disadvantage in '136. The instant invention concerns a polysiloxane contact lens which absorbs water in larger amounts. Water absorption is viewed by the instant inventors as an advantage. The Dutch reference '136 further teaches that a lens should not absorb water since, as taught in '136, such a lens would undergo changes, such as changing its optical properties. '136 further teaches that the handling of such a lens is difficult because it is swellable and physically weak. However, the instant lenses are made from water absorbing polysiloxane material which is also strong, durable and oxygen permeable. Nowhere does this Dutch reference disclose the instant polysiloxanes or the comonomers reacted with these monomeric siloxanes in order to form the instant water absorbing polymers disclosed herein.

U.S. Pat. No. 3,808,178 discloses, in pertinent part, a polymeric material containing a polymethacrylate backbone with relatively short poly(organosiloxane) ester side chains on the backbone polymer. There is no crosslinking involved in '178 since the monomers disclosed in '178 are monofunctional, i.e., have only one functional group on each monomer. In order to get crosslinking in '178 it is taught at column 5 of '178 that different monomers must be added for crosslinking which have more than one functionality. However, in the instant invention crosslinking is obtained since each siloxane monomer is difunctional, i.e., each siloxane monomer contains two functional groups, most preferably two methacrylate groups which results in crosslinking. Not only does '178 not teach the polysiloxane monomers used in the instant invention but '178 does not remotely teach the instant hydrophilic siloxane which is also water absorbing for use as soft, hydrophilic, water absorbing contact lens.

Katz and Zewi, "Correlations Between Molecular Structure and Some Bulk Properties of Highly Crosslinked Polysiloxanes", J. Polymer Sci., Vol. 46, Pages 139–148 (1974) teaches, in pertinent part, that divinyl monomers can be prepared by esterification of the carboxyl-terminated compounds with two molecules of a monoester of ethylene glycol and a monoester of acrylic acid. Polymerization can be effected by ultraviolet radiation at room temperature. Also taugth is the structure as shown on page 146 of the Katz et al article. If this formula were broken down as it relates to the preferred siloxane comonomer taught in the instant application, the formula would be as follows:

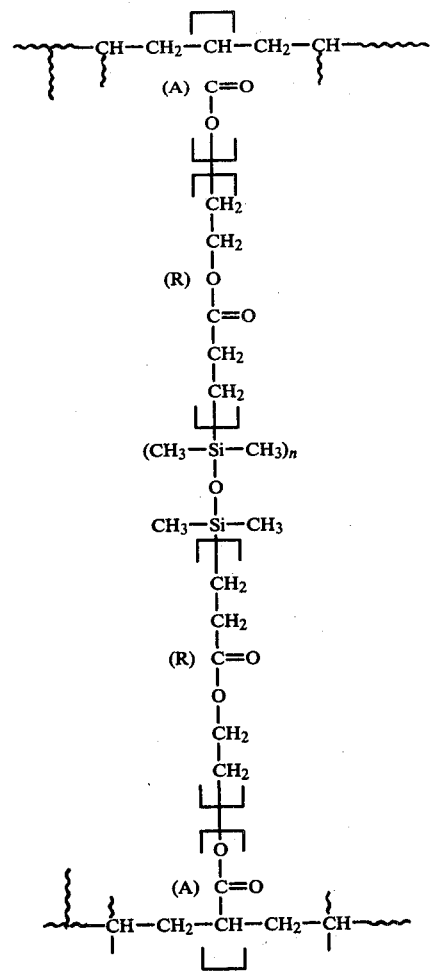

In the above formula the R group has an ester linkage whereas in the instant preferred siloxane comonomer the R is a hydrocarbon group.

Also in the above formula the center repeating unit is a dimethyl siloxane unit whereas the center repeating unit in the instant preferred siloxane comonomer is a polyorganosiloxane repeating unit as illustrated below. The R linkage in the Katz et al paper is not as hydrolytically stable as the hydrocarbon linkage in the instant preferred siloxane comonomer. The ester group in Katz et al can be hydrolyzed. This stability is important if this material is to be used in soft contact lenses or biomedical devices since these types of devices are usually heated in the presence of water in order to disinfect them. If the contact lens loses its shape, then it loses its optics. It should be understood that the instant preferred polysiloxane comonomer does have an ester linkage. However, this linkage is between the A and the R groups. It is actually located in the A group as illustrated below by a formula of one of the most preferred monomeric siloxanes of the instant invention.

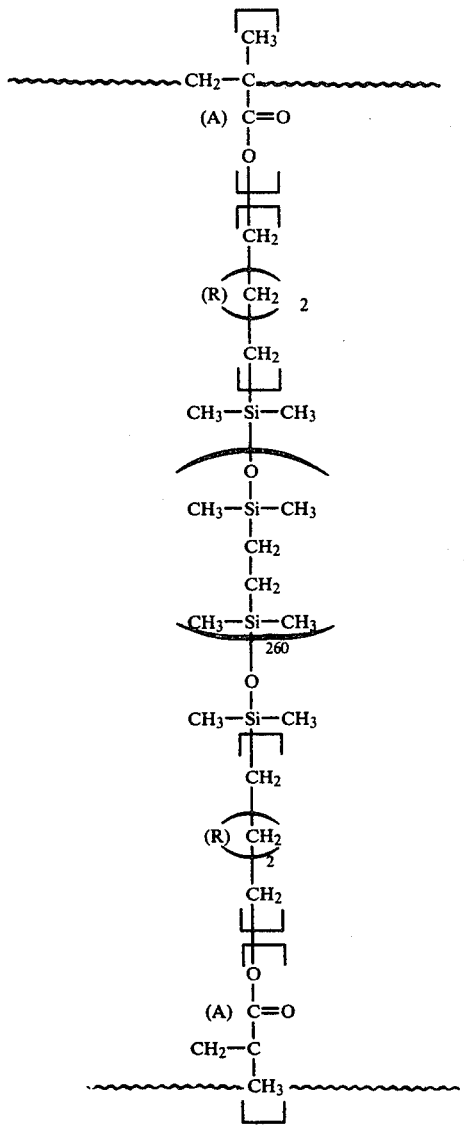

This Katz et al reference, in addition to teaching a specific formula on page 146, merely teaches that phase differences are detectable as the siloxane chain length is decreased. As the siloxane chain increases in length, Katz et al teaches that the phase differences are lost and these differences merge into one continuous transition.

In addition to the above, it is important to note that Katz et al does not suggest any usage for this material.

Katz and Zewi "Some Rheological Properties of Highly Crosslinked Polysiloxanes" J. Polymer Sci., Vol. 13, Pages 645-658 (1975) teaches, in pertinent part, the same materials as taught in the above cited (1974) article by Katz et al. This article teaches in more detail the steps necessary in order to make the starting materials for the polymer as taught in the '74 article. Katz et al is teaching in this article, in pertinent part, how to synthesize the carboxyl terminated siloxane. This is illustrated on pages 646-647. Katz et al then crosslinks this using a different chemical reaction than in the instant application in order to make the polymer as shown on page 649. This polymer is not related in any way to the instant materials. In addition to the above, it is important to note that this Katz et al reference also makes no mention of any uses of the material.

Katz and Zewi "Microheterogeneity in Crosslinked Polysiloxane" J. Polymer Sci. Polymer Chemistry Edition, Vol. 16, pages 597-614 (March, 1978) teaches, in pertinent part, the same materials as taught in the above cited (1974) and (1975) articles by Katz et al. The only new material mentioned appears on page 598, line 8, i.e., crosslinked polyesters. However, these crosslinked polyesters are not pertinent to the instant application. Katz et al is teaching in this article, in pertinent part, how to prepare certain monomers. Katz et al is merely suggesting the same crosslinked material as he suggested in his earlier (1974) and (1975) articles. Katz et al then discusses the physical properties and the microheterogeneity of these crosslinked polymers. He discusses the difference in the phase separation on the submicroscopic scale. As to the physical properties, which Katz et al mentioned in his article on page 597, he discusses the physical properties in general of polysiloxanes. Katz et al discusses specific properties of his polymers at page 609 where he presents modulus-temperature data. Then he discusses crosslinking efficiency on page 607. He is measuring properties which will give him an idea of his efficiency of crosslinking. Again, it should be stated that Katz et al in this (1978) article teaches no more material than he taught in his earlier articles except for the disclosure of the crosslinked polyesters on page 598. However, these materials are not relevant to the instant application. In addition to the above, it is important to note that this Katz reference also makes no mention of any uses of this material except as possible sealants.

W. A. Piccoli, G. G. Haberland and R. L. Merker, J. Am. Chem. Soc. "Highly Strained Cyclic Paraffin-Siloxanes", Vol. 82, pp. 1883-1885 (Apr. 20, 1960) teaches, in pertinent part, the preparation of the cyclic paraffin-siloxane monomers which may be used in the instant invention to make the preferred siloxane prepolymers of the instant invention. These preferred siloxane prepolymers, i.e., linear monomers, in the instant invention are then copolymerized and crosslinked to form the preferred polymers used for making contact lenses. It is disclosed on page 1884, column 2, lines 15-27, of the above article that these cyclic paraffin-siloxane monomers may be polymerized using strong acids or bases to form linear polymers. The preferred siloxane linear polymers, as mentioned, are used in the instant invention as preferred prepolymers and copolymerized and crosslinked to form materials for making contact lenses. Nowhere does the article disclose or suggest the crosslinked polymers of the instant invention. Neither does the article suggest or disclose that the polymers can be used to make contact lenses.

R. L. Merker and M. J. Scott J. of Polymer Sci., "The Copolymerization of Cyclic Siloxanes" Vol. 43, pp 297-310 (1960) teaches, in pertinent part, copolymerization studies using cyclic alkyl siloxanes. These materials are copolymerized with silethylene siloxane and then the rates of polymerization are determined. The silehtylene siloxane is used because it does not equilibrate between the ring form and the linear form. Once the ring form is broken the ring stays open, that is, the reaction is kept going in one direction. The crosslinked polymers of the instant invention are not suggested or taught by this article nor is the use of these polymers as contact lenses taught or suggested.

U.S. Pat. No. 3,041,362 and U.S. Pat. No. 3,041,363 teach, in pertinent part, the same materials as taught in the above mentioned articles coauthored by Merker and in the *J. Am. Chem. Soc.* and *J. of Polymer Sci.* However, in addition, it is taught that some polyfunctional siloxanes may be used with certain monomers to give cross-linked polymers and copolymers. However, the cross-linked copolymers of the instant invention are not taught or suggested by these references nor are the polymers which are taught by these references even relevant to the instant polymers. Further more, it is not taught or suggested by these references that these polymers could be used as contact lenses.

E. E. Bostick "Cyclic Siloxanes and Silazanes", chapter 8, pp 343–357, *Kinetics and Mechanisms of Polymerization*, Vol. B 2, Frisch and Regan, ed., (1969) teaches, in pertinent part, siloxane polymerization using cyclic siloxanes. This article teaches no more than the above mentioned article from J. of Polymer Sci., by R. L. Merker and M. J. Scott.

E. E. Bostick, *Chemical Reactions of Polymers*, High Polymers series vol. 19 (1964) E. M. Fettes, ed. chapter 7 "Interchange Reactions" section B "Silicones" pp 525 teaches, in pertinent part, siloxane copolymerization using cyclic siloxanes. It teaches that these reactions go in one direction. This article teaches no more than the above mentioned article from J. of Polymer Sci. by R. L. Merker and M. J. Scott.

U.S. Pat. No. 2,770,633 discloses 1,3-bis(4-methacryloxybutyl) tetramethyl disiloxane, one of the preferred siloxane monomers used in the instant invention. This is taught at column 1, line 63 of '633 when R equals vinyl. However, '633 teaches only the siloxane monomer whereas the instant invention teaches not only the siloxane monomers but the copolymer made from copolymerization of the polysiloxane monomer with acrylic acid and a cpolycyclic ester of acrylic acid or methacrylic acid to form a hydrophilic, water absorbing polysiloxane material for use in making soft contact lenses. '633 would not want the monomer disclosed in '633 to polymerize since it would not perform its intended function as a lubricant if polymerized.

U.S. Pat. Nos. 3,996,187, 3,996,189, 3,341,490 and 3,228,741 disclose, in pertinent part, contact lenses fabricated from poly(organosiloxanes) containing fillers. The tear strength and tensile strength of the contact lenses made from the instant polymer are of sufficient strength so that no fillers are required.

U.S. Pat. Nos. 3,996,187 and 3,996,189, as mentioned above, disclose contact lenses made from reinforced polysiloxanes. The lenses contain various polysiloxanes with index of refractions similar to the silica filler so that an optically clear silica filled silicone elastomer can be formed from aryl and alkyl siloxanes. The material contains from 5 to 20 percent silica. The silica is used, as mentioned, for strength. The instant invention contains no fillers for strength since the instant material has sufficient strength without fillers.

U.S. Pat. No. 3,341,490 discloses contact lenses made from blends of siloxane copolymers containing reinforcing silica fillers. As mentioned, the contact lenses of the instant invention contain no fillers.

U.S. Pat. No. 3,228,741 discloses contact lenses made from silicone rubber particularly hydrocarbon substituted polysiloxane rubber. This silicone material contains fillers such as pure silica to control flexibility, pliability and resiliency of the lenses. The instant polymers require no fillers.

U.S. Pat. No. 3,518,324 teaches vulcanizing to make silicone rubber whereas the instant invention is concerned with contact lenses made from polymerizing specific monomers.

U.S. Pat. No. 3,878,263 teaches one configuration which may be

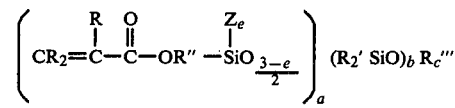

R may be monovalent hydrocarbons.

R' may be a monovalent hydrocarbon.

c may equal zero but when c equals zero then at least one Z must be OR''''.

Z is an important ingredient since this is used to cross-link the chains. Therefore, the monomers of the instant invention are not taught in '263.

U.S. Pat. No. 2,906,735 teaches a reaction between an alkyl siloxane and acrylic acid or a methacrylic acid resulting in a disiloxane terminated by acrylate groups. '735 does not teach the copolymers of the instant invention.

U.S. Pat. No. 2,922,807 discloses disiloxanes having acryloxy or methacryloxy groups attached to the silicone through a divalent alkylene radical of from 2 to 4 carbon atoms.

U.S. Pat. No. 3,763,081 discloses, in pertinent part, the polymerication of an unsaturated siloxane which is somewhat difficult to polymerize since a double bond in this type of monomer generally is not very active. One must use both high temperatures and peroxide catalysts or platinum catalysts in order to complete this type of reaction. See, for example, '081 at column 4 lines 35–46. In the instant preferred reaction the monomeric materials are referred to specifically as having activated unsaturated groups bonded through a divalent hydrocarbon group to the siloxane whereas '081 has no activated unsaturated groups bonded to the siloxane.

U.S. Pat. No. 2,865,885, in pertinent part, teaches a vinyl group which is not activated as shown in column 1, lines 25–30 of '885. The reason '885's double bond is not "active" in the sense as defined in the instant application is that the double bond is bonded to either sulfur or oxygen. In the instant invention this same position would have a

carbonyl group. This would make the double bond active as defined in the instant application. Therefore, '885 since the reactivity ratios are so different, i.e., the double bond is not active in '885 as defined in the instant invention, it would be very difficult to get an acceptable copolymerization reaction using the formulae of '885 as compared to the active double bond in the instant siloxane monomers which are easily copolymerized. In the instant invention the vinyl groups are "activated" to facilitate free radical polymerization. The formula given at column 1, lines 25–30 of '885 does not lend itself to free radical polymerization due to the lack of resonance but rather it lends itself to ionic polymerization due to the polar nature of the substituents. Therefore, it would be extremely difficult, if at all possible, for '885 to form the compounds of the instant invention. Also, the compounds formed in '885 are not hydrolytically stable because of the presence of the silicone-nitrogen bond in the formula. The instant invention cannot use a hydrolytically unstable compound. Furthermore, the products of this hydrolysis in '885 could be injurious to the human eye particularly the amines. Also at column 3 of '885, the linkage is an amine linkage to the double bond and in the instant invention this linkage is always an alkyl. Therefore, '885 does not teach the instant siloxane monomers much less than instant polymers or copolymers.

U.S. Pat. No. 2,793,223 teaches, in pertinent part, at Example 5 at column 3, lines 30–41 that a phenyl group is attached to the siloxane. Therefore, that material would be very hard and opaque. This would be unsuitable for contact lenses which must be transparent. Furthermore, contact lenses made from the polymers made from the monomers disclosed in '223, because of the presence of the phenyl group on the siloxane as shown in Example 5 of '223, might not transport oxygen sufficiently whereas contact lenses made from the instant polymers would transport oxygen sufficiently to meet the requirements of the human cornea.

SUMMARY OF THE INVENTION

The instant invention provides materials which can be used for biomedical devices, such as contact lenses, heart valves and intraocular lenses.

The instant invention comprises a soft, hydrophilic, water absorbing, flexible, fillerless, hydrolytically stable, biologically inert contact lens with the capability of transporting oxygen sufficiently to meet the requirements of the human cornea. The instant contact lens may be transparent in its preferred embodiment. The instant contact lens is prepared from a material comprising a polysiloxane monomer $\alpha,\omega$ terminally bonded through divalent hydrocarbon groups to polymerizable, free radical polymerizably activated, unsaturated groups copolymerized with acrylic acid and a polycyclic ester of acrylic acid or methacrylic acid forming a polymer in crosslinked network which is capable upon saturation with water of absorbing from about 1 percent to about 99 percent by weight, based on the total weight of the dry polymer, of water.

There are commercially available both hydrophobic and hydrophilic contact lenses. The hydrophobic contact lenses available are primarily hard contact lenses made from such materials as (PMMA) polymethyl methacrylate. However, there are soft contact lenses available which are hydrophilic. Furthermore, these lenses are usually water absorbing lenses and are made from polymers and copolymers based on (HEMA) hydroxyethylmethacrylate. However, neither of the materials made from PMMA or HEMA are oxygen permeable enough to meet the oxygen requirements of the human cornea. Therefore, a material had to be developed which was soft for comfort and also oxygen permeable to the extent that when made into a contact lens sufficient oxygen would pass through the material to meet all the requirements of the human cornea. It was found that polysiloxane materials are oxygen permeable to the extent that oxygen will pass through these materials sufficiently to meet the requirements of the human cornea when these materials are used to make contact lenses. Also contact lenses made from polysiloxanes are soft, resulting in more comfort for the wearer. Therefore, it was found that polysiloxane materials would be good candidates for making soft contact lenses. However, it was found that when soft contact lenses were made from polysiloxane materials, these lenses do not ride on the cornea of the eye on a layer of tears but rather attach themselves to the cornea in a manner which alters the metabolic outflow and inflow of fluid from the eye. It is known that non-movement or substantially non-movement of soft contact lenses on the eye can result in physical damage to the cornea. As mentioned, it has been noted that when a soft contact lens moves on the eye there is an exchange of tear fluid under the lens resulting in the exchange of metabolic products supplying the cornea and metabolic by-products being removed from the cornea. This movement of tear fluid results in maintaining a healthy environment for the cornea. This has been generally reported by Roth, H. W. and Iwasaki, W., *Complications Caused by Silicone Elastomer Lenses in West Germany and Japan*, paper presented at the 2nd Contact Lens Conference, February 18, 1979, in Tokyo, Japan (Prof. Motoichi Itoi, M.D., Kyoto Prefectural University of Medicine, Hirokohji, Kawara MachiDohri, Kamikyo-Ku, Kyoto 602); Kreiner, Christine F., Neues Optikerjournal, No. 2 (21) Feb. 10, 89 (1979); Von Arens, Franz D., Neues Optikerjournal No. 3, (21) Mar. 10, 93 (1979); and von Zimmermann, E., Neues Optikerjournal, No. 4, 21, Apr. 10, 73 (1979).

It was discovered that when a soft contact lens absorbs water and is hydrophilic, that the lens will move on the eye sufficiently so that no physical damage will occur to the cornea and sufficient tear exchange will occur so that corneal metabolism will proceed normally. This has been true when observing the PHEMA lens. We believe that the movement of silicone lenses could be aided if the lenses were water absorbing. However, prior to the instant invention, except as disclosed in U.S. Pat. No. 4,136,250 which was discussed earlier, no one had discovered a polysiloxane lens which was water absorbing and hydrophilic. Therefore, applicants found that all known polysiloxane soft contact lenses which applicants tested resulted in some type of adhering to the eye. This problem has been a major obstacle in preventing the use of polysiloxanes as soft contact lens materials. This major obstacle has now been overcome by the instant invention. Therefore, most unexpectedly the instant polysiloxane polymers are not only hydrophilic but are also water absorbing. Therefore, the instant polymers make excellent material for manufacturing contact lenses which not only do not stick to the eye but move sufficiently during normal wear so that corneal metabolism will proceed normally.

The instant polymers are much stronger than copolymers made from only acrylic acid and the instant polysiloxane monomers. Tensile strength has increased about 10 times over these copolymers. Tear strength has also greatly increased.

When the term "compatibility" is used herein, it is meant that when the materials are compatible these materials are optically clear, i.e., transparent and colorless. Therefore, the use of the polycyclic esters of acrylic acid as one of the monomers in the instant polymer maintains optical clarity in the polymer over a wide range of concentrations. Many other monomers cause the polymer to lose its optical clarity.

When the polysiloxane monomers of the instant invention are copolymerized with from about 1.0 percent to about 30.0 percent by weight, based on the total weight of the polymer, of acrylic acid, and from about 5.0 percent to about 50.0 percent by weight based on the total weight of the polymer, of a polycyclic ester of acrylic acid or methacrylic acid, a polymer is formed which has an unexpectedly high tensile strength and tear strength and is hydrophilic and water absorbing. When the copolymer was formed into contact lenses, the lenses when saturated with water, unexpectedly absorbed from about 1 percent to about 99 percent by weight of water, based on the total weight of the dry copolymer. As mentioned, this is completely unexpected since polysiloxanes are known to be hydrophobic, a few being hydrophilic but none known to absorb water except the material as taught in U.S. Pat. No. 4,136,250. This invention is a major advancement in the state of polysiloxane contact lens art.

More specifically, the instant invention comprises a soft, hydrophilic, water absorbing, flexible, fillerless, hydrolytically stable, biologically inert, transparent contact lens with the capability of transporting oxygen sufficiently to meet the requirements of the human cornea. The instant contact lens is made from a polysiloxane monomer $\alpha,\omega$ terminally bonded through divalent hydrocarbon groups to polymerized, free radical polymerizably activated, unsaturated groups copolymerized with acrylic acid and a polycyclic ester of acrylic acid or methacrylic acid and forming a polymer in a crosslinked network, capable upon saturation with water, of absorbing from about 1 percent to about 99 percent by weight, based on the total weight of the dry polymer, of water.

The three-dimensional network polymer products of the instant invention are readily prepared by means of conventional free radical polymerization techniques. The monomers together with about 0.05 to about 4.0 percent, preferably 0.05 to 2.0 percent by weight of an appropriate free radical initiator may be heated to a suitable temperature depending on the initiator used, i.e.g, from about 0° C. to about 100° C. to initiate and complete the polymerization. The polymerizable monomers can preferably be subjected at room temperature to radiation by UV light in the presence of suitable activators such as benzoin, acetophenone benzophenone and the like for a sufficient time so as to form a cured polymer.

The polymerization can be carried out directly in contact lens molds or can be cast into discs, rods, or sheets which can then be fabricated to a desired shape. Preferably the polymerization is carried out while the material is being spin cast, such as taught in U.S. Pat. No. 3,408,429.

When the term "movable soft contact lens" is used herein, it is meant that the lens moves sufficiently on the eye so that (1) no physical damage occurs to the cornea as a result of the absence of tear exchange; and (2) sufficient tear fluid exchange occurs under the lens so that sufficient corneal metabolic activity is maintained resulting in a healthy environment for the cornea.

When the term "movable soft contact lens" is used herein, it is meant that when the lens is placed on the eye and during normal wear, the lens will move at least 0.5 mm with each blink of the eyelid. Preferably the lens should move from about 0.5 mm to about 1.0 mm with each blink.

When the term "non-movable soft contact lens" is used herein, it is meant that the lens will move less than about 0.5 mm to 0 mm with each blink of the eyelid.

When the term "hydrophilic soft contact lens" is used herein, it is meant that the soft contact lens surface will not repel water as opposed to the "hydrophobic" where the lens surface will tend to repel water.

When the term "water absorbing soft contact lens" is used herein it is meant that the lens will absorb from about 1 percent to about 99 percent by weight, based on the total weight of the dry polymer, of water.

DESCRIPTION OF PREFERRED EMBODIMENTS

In accordance with the preferred embodiments of this invention shaped articles for use in biomedical applications including contact lenses are provided which are fabricated from three-dimensional network polymers comprising a polysiloxane monomer $\alpha,\omega$ terminally bonded through divalent hydrocarbon groups to polymerizable, free radical polymerizably activated, unsaturated groups polymerized from about 1.0 percent by weight to about 30.0 percent by weight, based on the total weight of the polymer of acrylic acid and from about 5.0 percent by weight to about 50.0 percent by weight based on the total weight of the polymer, of a polycyclic ester of acrylic acid or methacrylic acid forming a polymer in a crosslinked network capable of absorbing from about 1 percent to about 99 percent by weight, based upon the total weight of the dry polymer, of water.

The preferred amount of water absorbed is from about 5 percent to about 99 percent by weight, based on the total weight of the dry polymer, of water.

The preferred amount of acrylic acid is from about 5.0 percent to about 15.0 percent by weight based on the total weight of the polymer.

The preferred amount of the polycyclic ester of acrylic acid or methacrylic acid is from about 10.0 percent to about 40.0 percent based on the total weight of the polymer.

The term polycyclic ester of acrylic acid is meant to include, but not limited to, isobornyl acrylate, adamantanyl acrylate, dicyclopentadienyl acrylate and isopinocamphyl acrylate.

The term polycyclic ester of methacrylic acid is meant to include, but not limited to, isobornyl methacrylate, adamantanyl methacrylate, dicyclopentadienyl methacrylate and isopinocamphyl methacrylate.

When the terms "activated" or "free radical polymerizably activated" are used with the term "unsaturated groups" herein, it is meant that an unsaturated group which is activated is one which has a substituent which facilitates free radical polymerization. These activated unsaturated groups are polymerized to form the polymers of the instant invention. Preferably, the activating groups used herein lend themselves to free radical polymerization under mild conditions, such as ambient temperatures.

When the term polymer is used herein, it is meant to include a polymer having at least two different monomers incorporated into the polymer.

The preferred polysiloxane monomers are selected from the group consisting of a poly(organosiloxane) monomer having the formula

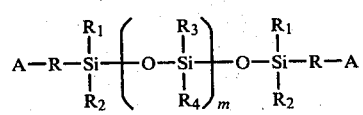

wherein A is an activated unsaturated group, R is a divalent hydrocarbon radical having from 1 to about 22 carbon atoms, $R_1$, $R_2$, $R_3$ and $R_4$ can be the same or different and each is one of a monovalent hydrocarbon radical or a halogen substituted monovalent hydrocarbon radical each having from 1 to about 12 carbon atoms and m is 0 or greater and a polyparaffinsiloxane monomer having the formula

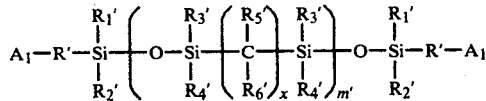

wherein $A_1$ is an activated unsaturated group; R' is a divalent hydrocarbon radical having from 1 to about 22 carbon atoms; $R'_1$, $R'_2$, $R'_3$ and $R'_4$ can be the same or different and are selected from the group consisting of a monovalent hydrocarbon radical having from 1 to about 12 carbon atoms and a halogen substituted monovalent hydrocarbon radical having from 1 to about 12 carbon atoms; $R'_5$ and $R'_6$ can be the same or different and are selected from the group consisting of hydrogen, a hydrocarbon radical containing from 1 to about 12 carbon atoms, a carboxylic acid group, a carboxylic acid ester group represented by the formula

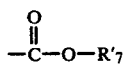

wherein $R'_7$ is selected from the group consisting of a hydrocarbon group containing from 1 to about 12 carbon atoms and a carboxylic acid amide represented by the formula

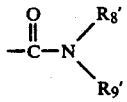

wherein $R'_8$ and $R'_9$ can be the same or different and each is selected from the group consisting of hydrogen and a hydrocarbon group containing from 1 to about 12 carbon atoms; x is 2 or greater than m' is 1 or greater.

The most preferred polysiloxane monomer is a poly(organosiloxane) monomer having the formula

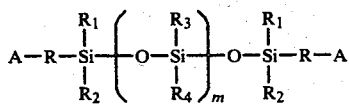

wherein m is preferably 50 to 800 and more preferably 50 to 200; wherein A is one of 2-cyanoacryloxy $$CH_2=C-C-O-,$$
acrylonitryl $$CH_2=C-,$$
$$|$$
$$C\equiv N$$
acrylamido -continued $$CH_2=CH-\overset{O}{\overset{\|}{C}}-NH-,$$
acryloxy $$CH_2=CH-\overset{O}{\overset{\|}{C}}-O-,$$
methacryloxy $$CH_2=C-\overset{O}{\overset{\|}{C}}-O-,$$
$$|$$
$$CH_3$$
styryl

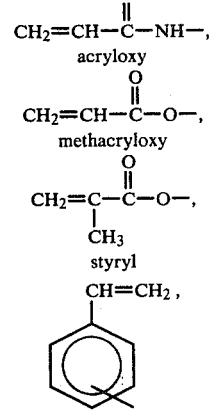

and
N—vinyl—2—pyrrolidinone—X—yl
wherein x may be 3, 4 or 5

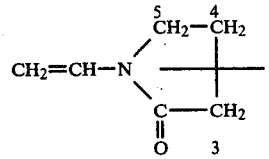

More preferably A is acryloxy or methacryloxy. However, other groups containing activated unsaturation can be readily employed, such groups being well known to those skilled in the art. Most preferably A is methacryloxy or acrylamido.

R may be preferably an alkylene radical. Therefore, preferably R is methylene, propylene, butylene, pentamethylene, hexamethylene, octamethylene, dodecylmethylene, hexadecylmethylene and octadecylmethylene; arylene radicals such as phenylene, biphenylene and the corresponding alkylene and arylene radicals. More preferably R is an alkylene radical having about 1, 3 or 4 carbon atoms. Most preferably R is an alkylene radical having from about 3 to 4 carbon atoms, e.g., butylene.

Preferably, $R_1$, $R_2$, $R_3$ and $R_4$ are alkyl radicals having from 1 to 12 carbon atoms, e.g., methyl, ethyl, propyl, butyl, octyl, dodecyl and the like; cycloalkyl radicals, e.g., cyclopentyl, cyclohexyl, cycloheptyl and the like; mononuclear and binuclear aryl radicals, e.g., phenyl, naphthyl and the like; aralkyl radicals, e.g., benzyl, phenylethyl, phenylpropyl, phenylbutyl and the like; alkaryl radicals, e.g., tolyl, xylyl, ethylphenyl and the like; haloaryl radicals such as chlorophenyl, tetrachlorophenyl, difluorophenyl and the like; halo substituted lower alkyl radicals having up to about four alkyl carbon atoms such as fluoromethyl and fluoropropyl. More preferably $R_1$, $R_2$, $R_3$ and $R_4$ are methyl radicals and phenyl radicals, most preferably $R_1$, $R_2$, $R_3$ and $R_4$ are methyl radicals.

The most preferred monomers, the activated unsaturated group end-capped poly(organosiloxane) monomers, employed in this invention can be prepared by equilibrating the appropriately substituted disiloxane, for example, 1,3-bis(4-methacryloxybutyl) tetramethyl disiloxane, with a suitable amount of a cyclic diorganosiloxane, e.g., hexamethyl cyclotrisiloxane, octaphenyl cyclotetrasiloxane, hexaphenylcyclotrisiloxane, 1,2,3-trimethyl-1,2,3-triphenylcyclotrisiloxane, 1,2,3,4-tetraphenylcyclotetrasiloxane and the like in the presence of an acid or base catalyst. The degree of softness, the physical properties such as tensile strength, modulus and percent elongation will determine the amount of cyclic diorganosiloxane equilibrated with the disiloxane. By increasing the amount of cyclic siloxane one increases m.

The reaction between a cyclic diorganosiloxane and disiloxanes, although not specifically disclosed for the disiloxanes employed in this invention as to provide the activated unsaturated groups as the end caps for polysiloxanes, is a conventional reaction and described by, for example, Kojima et al. Preparation of Polysiloxanes Having Terminal Carboxyl or Hydroxyl Groups, J. Poly. Sci., Part A-1, Vol. 4, pp 2325–27 (1966) or U.S. Pat. No. 3,878,263 of Martin issued Apr. 15, 1975, incorporated herein by reference.

The following reactions represent the most preferred poly(organosiloxane) monomer materials of the instant invention. 1,3-bis(hydroxyalkyl) tetramethyl disiloxane dimethacrylates are prepared by the following reactions: (1) esterification with acryloyl or methacryloyl chloride or anhydride. For example, the following is with methacryloyl chloride:

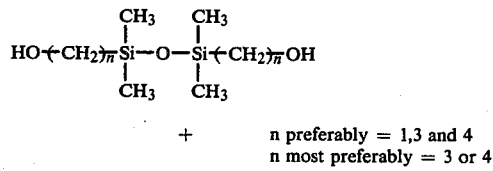

+ n preferably = 1,3 and 4
n most preferably = 3 or 4

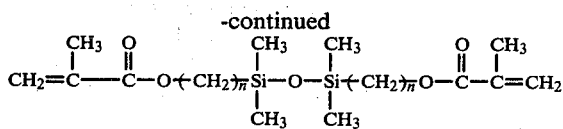

2 CH$_2$=C—C—Cl (with CH$_3$, O)

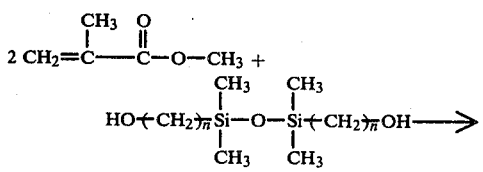

n preferably = 1,3 or 4
n most preferably = 3 or 4

(2) Another most preferred method of preparing 1,3-bis(hydroxyalkyl tetramethyl disiloxane dimethacrylates is by transesterification with methyl methacrylate:

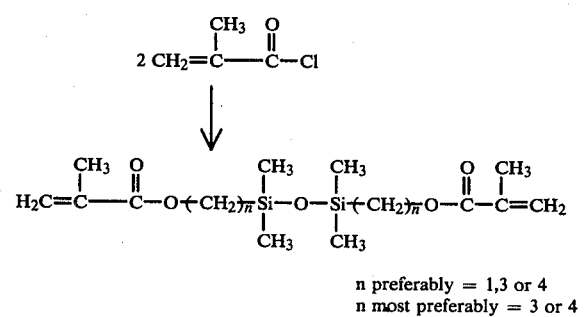

-continued

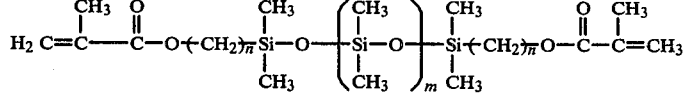

n preferably = 1, 3 or 4
n most preferably = 3 or 4

Then the number of siloxane groups between the two methacrylate caps can be increased from 2 to 2+4X by a ring opening insertion reaction with X moles of octamethyl cyclotetrasiloxane or 1,1,3,3-tetramethyl-1,3-disila-2-oxacyclopentane or mixtures thereof as follows:

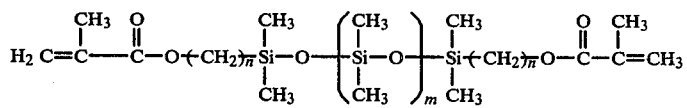

n preferably = 1, 3 or 4
n most preferably = 3 or 4

+

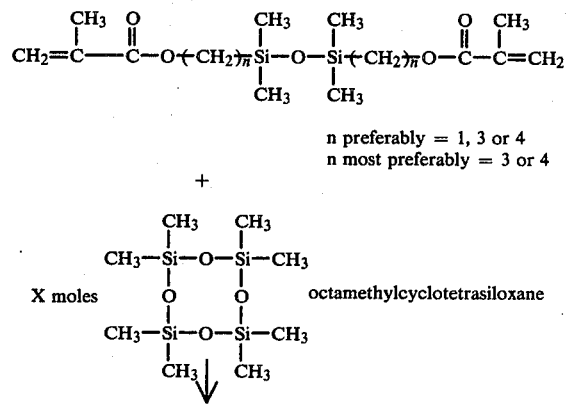

X moles octamethylcyclotetrasiloxane

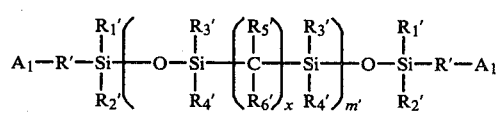

n preferably=1, 3 or 4
n most preferably=3 or 4
m preferably=50 to 800
m is more preferably=50 to 200

The above structure, i.e., a poly(organosiloxane) monomer, represents the most preferred polysiloxane monomer of the instant invention.

Preferably m is from about 50 to about 800. More preferably m is from about 50 to about 200.

When the term "soft" is used herein to describe the contact lenses of the instant invention, it is meant that m, in the above formula, after polymerization, is more than 25, preferably from about 50 to about 800.

Also, the preferred polysiloxane monomers of this invention may be a polyparaffinsiloxane monomer having the formula:

$$A_1-R'-\underset{\underset{R_2'}{|}}{\overset{\overset{R_1'}{|}}{Si}}\left(-O-\underset{\underset{R_4'}{|}}{\overset{\overset{R_3'}{|}}{Si}}-\left(\underset{\underset{R_6'}{|}}{\overset{\overset{R_5'}{|}}{C}}\right)_x-\underset{\underset{R_4'}{|}}{\overset{\overset{R_3'}{|}}{Si}}-\right)_{m'}O-\underset{\underset{R_2'}{|}}{\overset{\overset{R_1'}{|}}{Si}}-R'-A_1$$

wherein $A_1$ is an activated unsaturated group; $R'$ is a divalent hydrocarbon radical having from 1 to about 22 carbon atoms; $R'_1$, $R'_2$, $R'_3$ and $R'_4$ can be the same or different and are selected from the group consisting of a monovalent hydrocarbon radical having from 1 to about 12 carbon atoms and a halogen substituted monovalent hydrocarbon radical having from 1 to about 12 carbons atoms; R′₅ and R′₆ can be the same or different and are selected from the group consisting of hydrogen, a hydrocarbon radical containing from 1 to about 12 carbon atoms, a carboxylic acid group, a carboxylic acid ester group represented by the formula

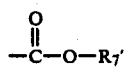

wherein R′₇ is selected from the group consisting of a hydrocarbon group containing from 1 to about 21 carbon atoms and a carboxylic acid amide represented by the formula

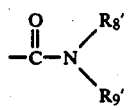

wherein R′₈ and R′₉ can be the same or different and each is selected from the group consisting of hydrogen and a hydrocarbon group containing from 1 to about 12 carbon atoms; x is 2 or greater and m′ is 1 or greater. Preferably m′ is 1 to 800 and more preferably 25 to 500.

More preferably A′ may be

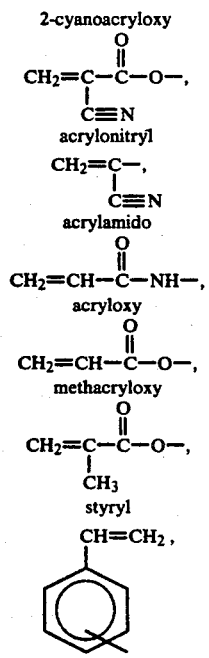

and
N—vinyl—2—pyrrolidinone—x—yl
wherein x may be 3, 4 or 5

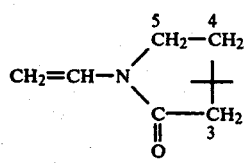

More preferably A′ is acryloxy or methacryloxy. However, other groups containing activated unsaturation can be readily employed, such groups being well known to those skilled in the art. Most preferably A′ is methacryloxy or acrylamido.

R′ may be preferably an alkylene radical. Therefore, preferably R′ is methylene, propylene, butylene, pentamethylene, hexamethylene, octamethylene, dodecylmethylene, hexadecylmethylene and octadecylmethylene; arylene radicals such as phenylene, biphenylene and the corresponding alkylene and arylene radicals. More preferably R′ is an alkylene radical having about 1, 3 or 4 carbon atoms. Most preferably R′ is an alkylene radical having from about 3 to 4 carbon atoms, e.g., butylene.

Preferably R′₁, R′₂, R′₃ and R′₄ are alkyl radicals having from 1 to 12 carbon atoms, e.g., methyl, ethyl, propyl, butyl, octyl, dodecyl and the like; cycloalkyl radicals, e.g., cyclopentyl, cyclohexyl, cycloheptyl and the like; mononuclear and binuclear aryl radicals, e.g., benzyl, phenylethyl, phenylpropyl, phenylbutyl and the like; alkaryl radicals, e.g., tolyl, xylyl, ethylphenyl and the like; haloaryl radicals such as chlorophenyl, tetrachlorophenyl, difluorophenyl and the like; halo substituted lower alkyl radicals having up to about four alkyl carbon atoms such as fluoromethyl and fluoropropyl. More preferably R′₁, R′₂, R′₃ and R′₄ are methyl radicals and phenyl radicals, most preferably R′₁, R′₂, R′₃ and R′₄ are methyl radicals.

Preferably R′₅ and R′₆ are selected from the group consisting of hydrogen, a hydrocarbon containing from 1 to about 6 carbon atoms and a carboxylic acid group. More preferably R′₅ and R′₆ are selected from the group consisting of hydrogen and methyl.

Preferably R′₇ is a hydrocarbon group containing from 1 to about 6 carbon atoms. Most preferably R′₇ is methyl.

Preferably R′₈ and R′₉ are selected from the group consisting of hydrogen and a hydrocarbon containing from 1 to about 4 carbon atoms. Most preferably R′₈ and R′₉ are selected from the group consisting of hydrogen and methyl.

The polyparaffinsiloxane monomers employed in this invention can be prepared by equilibrating the appropriately substituted disiloxane, for example, 1,3-bis(4-methacryloxybutyl) tetramethyl disiloxane, with a suitable amount of cyclic paraffinsiloxanes as described in Piccoli, et al, J. Am. Chem. Soc., "Highly Strained Cyclic Paraffin-Siloxanes" Vol. 82, pp 1883–1885 (Apr. 20, 1960). The degree of softness, the physical properties such as tensile strength, modulus and percent elongation will determine the amount of cyclic organoparaffinsiloxane equilibrated with the disiloxane. By increasing the amount of cyclic paraffinsiloxane, one increases m.

The reaction between a cyclic paraffinsiloxane and disiloxanes, although not specifically disclosed for the disiloxanes employed in this invention is a conventional reaction and described by, for example, in Merker U.S. Pat. No. 3,041,362 issued June 26, 1962, incorporated herein by reference.

The following reactions represent the most preferred materials of the instant invention. 1,3-bis(hydroxyalkyl) tetramethyl disiloxane dimethacrylates are prepared by the following reactions: (1) esterification with acryloyl or methacryloyl chloride or anhydride. For example, the following is with methacryloyl chloride:

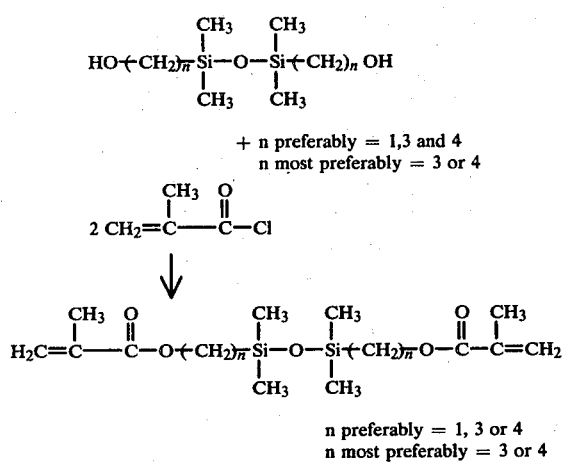

+ n preferably = 1, 3 and 4
n most preferably = 3 or 4

(2) Another most preferred method of preparing 1,3-bis(hydroxyalkyl) tetramethyl disiloxane dimethacrylates is by transesterification with methyl methacrylate:

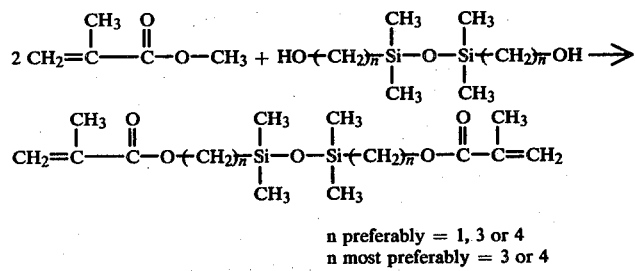

n preferably = 1, 3 or 4
n most preferably = 3 or 4

Then the paraffinsiloxane groups between the two methacrylate caps can be inserted by a ring opening insertion reaction with 1,1, 3,3-tetramethyl-1,3-disila-2-oxacyclopentane or octamethylcyclotetrasiloxane or mixtures thereof as follows:

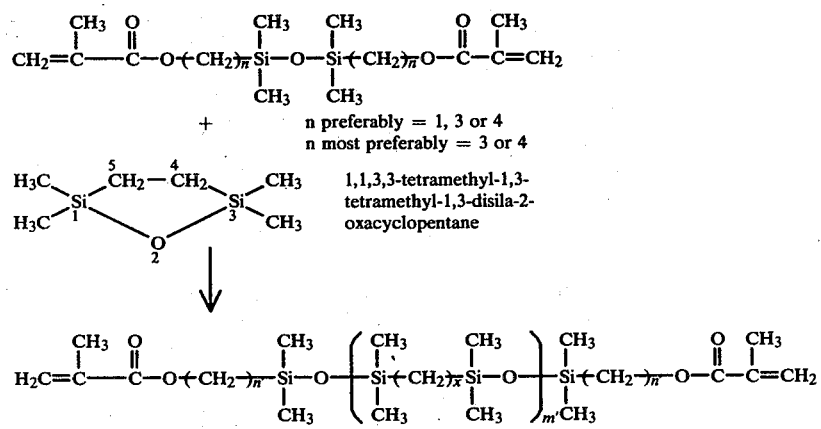

n' preferably = 1, 3 or 4
n' most preferably = 3 or 4
m' preferably = 1 to about 800
m' more preferably = 20 to about 500
m' most preferably = 20 to about 200
x = 2 above, however, preferably x = 2 or 3

The above structural formula represents the preferred polyparaffinsiloxane monomer of the instant invention.

The polyparaffinsiloxane monomers when polymerized with acrylic acid and a polycyclic ester of acrylic acid or methacrylic acid can be readily cured to cast shapes by conventional methods such as UV polymerization, or through the use of free radical initiators plus heat. Illustrative of free radical initiators which can be employed are bis(isopropyl) peroxydicarbonate, azobisisobutyronitrile, acetyl peroxide, lauroyl peroxide, decanoyl peroxide, benzoyl peroxide, tertiary butyl peroxypivalate and the like.

In order to further control the properties of the polymers of the instant invention one can polymerize a mixture of the polyparaffinsiloxane monomers comprising polyparaffinsiloxane monomers having a low value of m and polyparaffinsiloxane monomers having a high value for m with acrylic acid and a polycyclic ester of acrylic acid or methacrylic acid. When m in the polyparaffinsiloxane monomers has a relatively high value, i.e., above 20, the resulting contact lenses or biomedical devices are soft, hydrophilic, water absorbing, oxygen tranporting, flexible, hydrolytically stable, biologically inert, transparent, resilient, and do not need fillers to improve the mechanical properties. All the monomers should have preferably a molecular weight low enough so that the viscosity is low enough to spin cast the monomers, e.g., about 175 strokes or below measured in Gardner viscosity tubes. Preferably m' is about 1 to 800 and most preferably 20 to 500.

The preferred polycyclic esters of acrylic acid include isobornyl acrylate, adamantanyl acrylate, dicyclopentadienyl acrylate and isopinocamphyl acrylate.

The contact lenses of the instant invention, which are made from polymers which contain in addition to polysiloxane monomers and acrylic acid also polycyclic esters of acrylic acid or methacrylic acid, have a higher modulus and higher tear strength as compared to contact lens made from the copolymers of only the polysiloxane monomers and acrylic acid.

Preferably the polycyclic ester of acrylic acid or methacrylic acid is present in amounts from about 10.0 percent by weight to about 40.0 percent by weight based on the total weight of the polymer.

Preferably the acrylic acid is present in amounts from about 5.0 percent by weight to about 15.0 percent by weight based on the total weight of the polymer.

The advantages of using the instant polymers for making the soft contact lens of the instant invention are numerous. However, most importantly and unexpectedly the soft contact lenses of the instant invention are not only hydrophilic but water absorbing. As mentioned, the art teaches that polysiloxanes are generally hydrophobic. There are a few exceptions in the art where it is taught that certain polysiloxanes are hydrophilic. However, only in U.S. Pat. No. 4,136,250 and in the instant invention is it taught that a polysiloxane may be water absorbing. As a result of the instant polysiloxanes being water absorbing, soft contact lenses made from these polysiloxanes will not attach themselves to the cornea. The polysiloxane soft contact lens art has been greatly advanced by this discovery. Now, the otherwise very desirable polysiloxane soft contact lens can be worn without physically damaging the eye by attaching themselves thereto.

Further advantages of using the polysiloxane monomers are (1) the advantages of using activated vinyl terminal groups to cure the siloxane material which permit rapid cure at preferably room temperature if suitable initiators are used. This is desirable since the preferred method of casting the contact lens is spin casting. (2) No fillers are needed to get useful physical strength as is common with most silicone resins. This is desirable since the use of fillers requires that other possibly undesirable materials be added to the composition in order to correct the refractive index of the contact lenses. (3) Furthermore, the polysiloxane monomers and the copolymers of the instant invention are oxygen transporting. This is important if the material is to be used for contact lenses. The human cornea requires about $2 \times 10^{-5}$ cm$^3$/(sec.cm$^2$atm.) of oxygen through the contact lenas as reported by Hill and Fatt, *Americal Journal of Optometry and Archives of the American Academy of Optometry*, Vol. 47, pp 50, 1970. When m is at least about 4 the chain of siloxane is long enough in the instant composition to exceed the oxygen transportability requirements of the cornea. However, in specific situations m may be as low as 1. Because of the unique properties of the contact lenses of the instant invention m or m' in the polysiloxane monomers should be great enough to allow sufficient oxygen transportability and at the same time will retain its desirable properties of elasticity, tear resistance, flexibility, resilience and softness.

When the terms "oxygen transportability", "oxygen transporting" or "oxygen permeability" are used in the instant application it is meant that the material will allow sufficient transmission of oxygen through itself to supply the necessary oxygen requirements of the human cornea and other living tissue. The oxygen requirement for the human cornea, as mentioned, is about $2 \times 10^{-6}$ cm$^3$/(sec.cm$^2$atm.). The oxygen permeability was determined by a special test procedure described in conjunction with the explanation of Table I herein. (4) These soft contact lenses are hydrolytically stable meaning that when the contact lenses or devices are placed into an aqueous solution, e.g., in the eye, or during the disinfecting step, i.e, water plus heat, the lenses will not change significantly in chemical composition, i.e., hydrolyze and cause the lenses to change shape resulting in an undesirable change in optics. (5) The contact lenses of the instant invention are also resilient. When the term "resilient" is used herein it is meant that after the lenses have been deformed the lenses or devices will return quickly to their original shape. (6) The lenses are preferably made by spin casting, e.g, by the method as disclosed in U.S. Pat. No. 3,408,429. Monomers which have high viscosity may present a problem in spin casting. However, generally the higher the molecular weight of the polysiloxane monomers the more desirable are the oxygen transporting properties. The longer the chain length and the higher the molecular weight the higher the viscosity of the monomers. However, if spin casting is to be used the viscosity of the polysiloxcane monomers must be such that these materials can be spin cast. The polysiloxane monomers of the instant invention can have molecular weights high enough to give all the desirable properties when polymerized but low enough to be spin cast while still in the monomeric form. The preferred weight average molecular weight is from about 4,000 to 60,000 for the polysiloxane monomers of the instant invention. (7) The contact lenses of the instant invention are soft. By the use of the term "soft" in the instant application it is meant that the lenses should have a Shore hardness of about 80 or below on the A scale. (8) The preferred contact lenses of the instant invention should be flexible. When the term "flexible" is used herein, it is meant that the contact lens is capable of being folded or bent back upon itself without breaking.

The most preferred contact lens of the instant invention is a soft, hydrophilic, water absorbing, fillerless, oxygen transporting, flexible, hydrolytically stable, biologically inert, transparent, resilient polymeric contact lens comprising a polysiloxane monomer $\alpha,\omega$ terminally bonded through divalent hydrocarbon groups to polymerizable, free radical polymerizably activated unsaturated groups polymerized with acrylic acid and preferably isobornyl acrylate. The polysiloxane monomer used to make the copolymer from which the contact lens is made has the preferred formula selected from the group consisting of a poly(organosiloxane) monomer with the formula

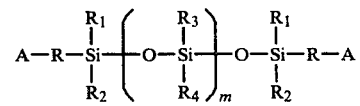

wherein A is selected from the group consisting of methacryloxy and acryloxy, R is an alkylene radical having from about 3 to about 4 carbon atoms and m is from about 50 to 800 and a polyparaffinsiloxane monomer with the formula

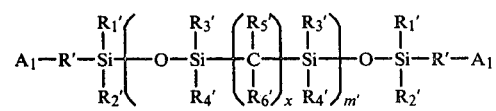

wherein $A_1$ is selected from the group consisting of methacryloxy and acryloxy; R' is an alkylene radical having from 3 to 4 carbon atoms; $R'_1$, $R'_2$, $R'_3$ and $R'_4$ can be the same or different and are monovalent hydrocarbon radicals having from 1 to about 12 carbon atoms; $R'_5$ and $R'_6$ are hydrogen atoms, x is 2 or 3 and m' is 20 to 500.

The most preferred contact lenses of the instant invention, as mentioned, are hydrophilic, water absorbing, have an oxygen transport rate of at least about $2 \times 10^{-6}$ cm$^3$/(sec.cm$^2$atm.), are hydrolytically stable, biologically inert, transparent, resilient, and have a softness preferably of about 80 or below on the Shore hardness A scale. Most preferably the Shore hardness should be 45 to 55 on the A scale. To further illustrate the most preferred contact lenses of the instant invention's physical properties, the tensile modulus of elasticity should be about 8000 g/mm$^2$ or less. The preferred tensile modulus of elasticity is from about 50 g/mm$^2$ to about 8000 g/mm$^2$. If the material is to be used as contact lenses then the Shore hardness and modulus may be related to the comfort of the lenses to the wearer when used on the human eye.

Another advantage of the preferred embodiment, i.e., soft contact lenses, of the instant invention is that lenses made from the polymers of the instant invention can be made large enough to cover the entire cornea of the eye resulting in more comfort. Hard contact lenses, such as PMMA lenses, have to be made smaller due to their poor oxygen transportability. Furthermore, the larger the lenses, the easier it is to locate the optical center of the lenses. The larger the lens the easier it is to maintain the optical axis which is required in making special lenses, e.g., for those persons with astigmatism. Another advantage of the preferred soft lenses of the instant invention is that the instant preferred soft lenses can have a softness similar to HEMA lenses but, in addition, and most importantly, are more oxygen permeable, i.e., are capable of transporting more oxygen and can be made water absorbing to the same extent at the HEMA lenses. HEMA lenses are not oxygen permeable or capable of transporting oxygen to a degree necessary to meet all the oxygen requirements of the human cornea.

When the word "oxygen permeable" is used herein it means that the instant copolymers will transport oxygen at a rate of at least about $2 \times 10^{-6}$ cm$^3$/(sec.cm$^2$atm.).

While the polymers of the instant invention can be used to prepare contact lenses these polymers can also be employed for other uses, such as shaped articles for use in biomedical applications. These polymers can be used to make biomedical devices, i.e., shaped articles, such as dialyzer diaphragms, to prepare artificial kidneys and other biomedical implants, such as disclosed in Wichterle, U.S. Pat. No. 2,976,576 and Wichterle, U.S. Pat. No. 3,220,960. The instant polymers can be used to modify collagen to make blood vessels, urinary bladders and other such devices as disclosed in Kliment U.S. Pat. No. 3,563,925. The instant polymers can be used to make catheters as disclosed in Shephard U.S. Pat. No. 3,566,874. The polymers can be used in semipermeable sheets for dialysis, artifical dentures and all of such disclosures as set forth in Stoy U.S. Pat. No. 3,607,848. The instant polymers can be used in ophthalmic prostheses and all other uses disclosed in Wichterle U.S. Pat. No. 3,679,504.

When the terms "shaped article for use in biomedical applications" or "biomedical device" are used herein it is meant that the materials disclosed herein have physiochemical properties rendering them suitable for prolonged contact with living tissue, blood or the mucous membrane such as would be required for biomedical shaped articles, such as surgical implants, blood dialysis devices, blood vessels, artificial ureter, artificial breat tissue and membranes intended to come in contact with body fluid outside of the body, for example, membranes for kidney dialysis and heart/lung machines and the like. It is known that blood, for example, is rapidly damaged in contact with artificial surfaces. The design of a synthetic surface which is antithrombogenic and nonhemolytic to blood is necessary for prosthesis and devices used with blood. The polymers are compatible with living tissue.

The polymers disclosed herein can be boiled and/or autoclaved in water without being damaged whereby sterilization may be achieved. Thus, an article formed from the instant polymers disclosed herein may be used in surgery where an article compatible with living tissue or with the mucous membrane may be used.

The following examples are illustrative only and should not be construed as limiting the invention. All parts and percents referred to herein are on a weight basis and all viscosities measured at 25° C. unless otherwise specified.

EXAMPLE I 557 g of 1,3-bis(4-hydroxybutyl) tetramethyl disiloxane, 634 g of dry pyridine and 2 liters of hexane are charged to a 5 liter reaction flask equipped with a mechanical stirrer and drying tube. The mixture is chilled to 0° C. and then 836 g of methacryloyl chloride is added dropwise. The mixture is agitated continuously overnight. The reaction solution is extracted consecutively with 10% water solutions of HCl and NH$_3$ in order to remove excess reagents and pyridine hydrochloride. The resulting solution of the product in hexane is dried with anhydrous MgSO$_4$. The MgSO$_4$ is filtered off and the solvent is removed at reduced pressure. About 459 g (55% yield) of 1,3-bis(4-methacryloxy butyl) tetramethyl disiloxane is collected. The structure is confirmed by infrared spectra, proton magnetic resonance spectra and elemental analysis. IR spectra shows no intense hydroxyl band between 3100 and 3600 cm$^{-1}$ but does show strong methacrylate absorptions at 1640 and 1720 cm$^{-1}$. PMR spectra agreed with the proposed structure:

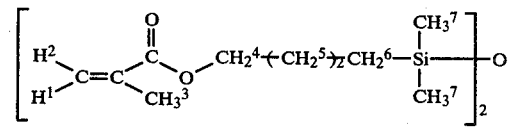

1,3-bis(4-methacryloxy butyl) tetramethyl disiloxane.

| Proton | ppm | Integrated Area | Multiplicity |
| --- | --- | --- | --- |
| H$^1$ | 7.0$_5$ | 1 | singlet |
| H$^2$ | 6.5$_0$ | 1 | singlet |
| H$^3$ | 3.0$_0$ | 3 | singlet |
| H$^4$ | 5.1$_5$ | 2 | triplet |
| H$^5$ | 2.7 | 4 | multiplet |
| H$^6$ | 1.6$_5$ | 2 | triplet |
| H$^7$ | 1.2$_0$ | 6 | singlet |

Elemental analysis gave 13.6% Si (Calc. 13.5%), 58.1% C (Calc. 57.9%, and 9.4% H (Calc. 9.2%). The product was a clear, colorless, fragrant fluid.

EXAMPLE II 489.75 g of octamethylcyclotetrasiloxane and 10.25 g of 1,3-bis(4-methacryloxybutyl) tetramethyl disiloxane as prepared in Example I are charged into a reaction vessel equipped with a mechanical stirrer. About 25 g of Fuller's Earth and 1.35 ml of conc. $H_2SO_4$ are mixed and added to the vessel with continuous stirring while bubbling dry $N_2$ through the reaction mixture. The charge is warmed to 60° C. and stirred for two days, at which time the viscous fluid is neutralized with $Na_2CO_3$, diluted with hexanes and filtered. The hexanes/monomer solution is washed with water, dried with $MgSO_4$ (anhydrous). The $MgSO_4$ is filtered off and the solvent is removed at reduced pressure. Low molecular weight unreacted cyclic siloxanes are removed by heating the monomer to 110° C. at 0.2 mm Hg in a rotary evaporator. The product obtained is an odorless, colorless, clear fluid of 8.5 stokes viscosity measured in Gardner Viscosity tubes. The monomer comprised about 240 repeating $Me_2SiO$ units. Fluid collected during the devolatilizing of the product shows no methacrylate absorptions in IR spectra and could not be cured.

IR spectra of the monomer shows a slight methacrylate absorption and broad siloxane absorptions between 1000 and 1100 cm$^{-1}$, indicative of linear poly(dimethyl siloxanes) with the following formula:

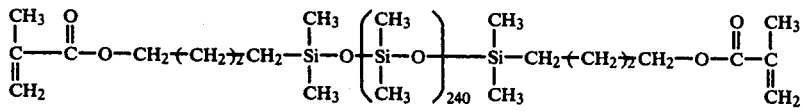

EXAMPLE III 31.1 g of the material as prepared in Example I, i.e., 1,3-bis(4-methacryloxybutyl) tetramethyl disiloxane and 977.3 g of octamethylcyclotetrasiloxane and is charged to a 2-liter round bottom polymerization flask.

1.5 ml of trifluoromethane sulphonic acid, available from Aldrich Chemical Company, is added into the polymerization flask equipped with a reflux condensor. An increase in the viscosity of the reaction mixture is noted two or three minutes after the addition of the acid to the flask. The reaction mixture is stirred with a mechanical stirrer at about 200 rpm for about three hours. Next, the polymerization mixture is neutralized by the addition of 14.2 g solid $NaHCO_3$. The mixture is then stirred for about three hours at about 200 rpm. In order to remove the $NaHCO_3$, 800 ml of n-hexane is added to the reaction product. The mixture is stirred for about 0.5 hours at about 200 rpm, stirring is then stopped and the reaction product is allowed to stand for about 0.5 hours in order for the $NaHCO_3$ to sedimentate. Then the mixture in hexane is filtered through a millipore filter column having a 5.0 micrometer filter bottom. Celite ® (diatomaceous earth) is used as a filtering aid. The filtrate is dried with $MgSO_4$ under stirring in order to remove water. Stirring is continued for 0.5 hours. The reaction product is again filtered through the millipore filter to remove the hydrated $MgSO_4$. The excess solvent is removed in vacuo on a rotating evaporator. Finally, the reaction product is subjected to a thin film distillation in high vacuum to remove low molecular impurities. The viscosity of the product, measured by Cannon-Fenske viscosity tubes, is 4.9 stokes. The structure of the clear, colorless product corresponds to the following formula:

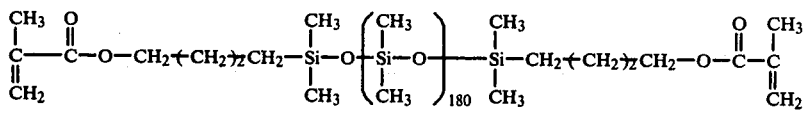

EXAMPLE IV

To 72.7 parts of the monomer as prepared in Example III is added 18.2 parts of isobornylacrylate (IBA) and 9.1 parts of acrylic acid and 1 part of diethoxy acetophenone. After mixing, this solution is placed between 3"×4" glass plates separated by a 0.2 mm peripheral gasket thereby forming a cell. The material is then irradiated with UV light for two hours. After irradiation the plates are separated and the film removed.

This film is optically clear and tough. All the various polymers, with test results shown in Table I, were prepared as in this Example.

EXAMPLE V

Films of the fluid product of Example III are cast between glass plates by adding 0.2% bis(isobutyl)-peroxy dicarbonate to the monomer and heating for ¼ hour at 40° C., ½ hour at 60° C. and ¼ hour at 80° C. The glass plates are separated. The films are then kept at 80° C. for 15 minutes. The properties of this film are recorded in Table I as D material.

EXAMPLE VI 96.9 g 1,1,3,3-tetramethyl-1,3-disila-2-oxacyclohexane available from Silar Labs, 10 Alplaus Road, Scotia, New York 12302, and 3.1 g 1,3-bis(4-methacryloxybutyl)tetramethyl disiloxane as prepared in Example I are charged to a 200 ml round bottom polymerization flask. 1.3 ml trifluoromethane sulphonic acid available from Aldrich Chemical Co. is added to the polymerization flask and the flask stoppered. An increase in the viscosity of the flask's contents and the evolution of heat are noted 2 to 3 minutes after the addition of the acid to the flask. The flask's contents are agitated on a shaker overnight. Next the polymerization mixture is neutralized by the addition of 10 g $Na_2CO_3$. Hexane is added to the viscous product and the solution filtered to remove the carbonate. The hexane solution of the product is then washed three times with water and dried over $MgSO_4$. The hexane is removed from the product at reduced pressure. The viscosity of the product as measured with Gardner viscosity tubes is 9.0 stokes. The number average and weight average molecular weights as measured by gel permeation chromatography are 12,300 and 31,700 respectively. The structure of the clear colorless product is that of the following formula:

Column 12 of Table I represents tear strength as conducted in accordance with ASTM D1004. This is

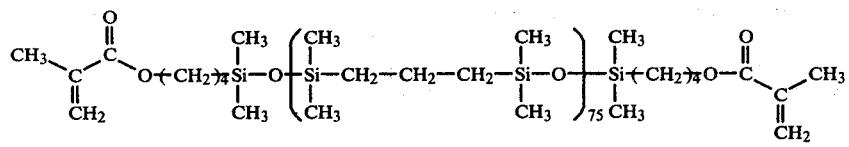

TABLE I

| Monomer 1 | Wt. % 2 | Monomer 3 | Wt. % 4 | Monomer 5 | Wt. % 6 | Tensile 7 | Modulus 8 | Elong. 9 | Tear Initial 10 | Tear Prop 11 | Tear 12 | O₂ Perm. P. 10¹⁰ 13 | Ratio 14 | % H₂O 15 | % H₂O 16 | 17 |
|---|---|---|---|---|---|---|---|---|---|---|---|---|---|---|---|---|
| A | 85.7 | B | 9.5 | C | 4.7 | 59 | 108 | 97 | 2.8 | 2.14 | 59 | 12.2 | 14.9 | 8.98 | 9 | Clear |
| A | 83.7 | B | 9.3 | C | 7.0 | 65 | 100 | 123 | 2.4 | 1.9 | 29 | 11.7 | 14.3 | 15.9 | 18.9 | Clear |
| A | 81.9 | B | 9.1 | C | 9.0 | 50 | 95 | 89 | 2.4 | 1.9 | 49 | 9.57 | 11.7 | 21.5 | 27.4 | Clear |
| A | 80.0 | B | 8.9 | C | 11.1 | 48 | 94 | 89 | 2.25 | 2.09 | 28 | 9.0 | 11.0 | 30.7 | 44.3 | Clear |
| A | 78.3 | B | 8.7 | C | 13.0 | 53 | 99 | 95 | 2.4 | 2.04 | 32 | 4.29 | 5.2 | 38.2 | 61.8 | Clear |
| A | 74.1 | B | 8.3 | C | 16.6 | 38 | 78 | 84 | 1.6 | 1.4 | 32 | 9.2 | 11.2 | 51.5 | 106.2 | Hazy |
| A | 72.0 | B | 8.0 | C | 20.0 | 36 | 70 | 84 | 1.76 | 1.76 | 19 | 4.19 | 5.1 | 60.1 | 150.62 | Hazy |
| A | 73.9 | B | 13.1 | C | 13.0 | 58 | 89 | 132 | 3.16 | 2.68 | 35 | 7.2 | 8.8 | 34.9 | 53.61 | Clear |
| A | 79.1 | B | 13.9 | C | 7.0 | 67 | 108 | 134 | 4.2 | 3.7 | 32 | 9.55 | 11.7 | 16.7 | 20.05 | Clear |
| A | 84 | B | 21.0 | C | 5.0 | 173 | 434 | 170 | 13.1 | 12.7 | 153 | 7.8 | 9.5 | | | Clear |
| A | 61.9 | B | 33.3 | C | 4.76 | 583 | 3410 | 205 | 88 | 88 | 651 | 12.5 | 15.2 | 2.4 | 2.5 | Clear |
| PHEMA | 100 | | | | | 40 | 40 | 150 | | | | 0.82 | 1.0 | 38.0 | 61.3 | Clear |
| D | 100 | | | | | 98 | 98 | 139 | 3.28 | 2.73 | 78 | 13.2 | 16 | * | * | Clear |

A monomer prepared as in Example III.
B monomer isobornylacrylate (IBA).
C monomer acrylic acid.
D polymer as prepared in Example V.
PHEMA polyhydroxyethyl methacrylate contact lens material.
Column 7 = g/mm²
Column 8 = g/mm²
Column 13 = P = Oxygen $$\text{permeability} = \frac{CC \cdot Cm}{Sec \cdot Cm^2 \cdot mmHg}$$

Column 14 = $\frac{\text{Oxygen Permeability of Sample}}{\text{Oxygen Permeability of PHEMA}}$ Column 15 = % by weight of water absorbed based on the total weight of the polymer plus water.
Column 16 = % by weight of water absorbed based on the total weight of the polymer.
Columns 15* and 16* = hydrophobic material.

In Table I in the first column, the letter A represents a monomer as prepared in Example III, in column 3 of Table I, the letter B represents isobornylacrylate and in column 5 of Table I, the letter C represents acrylic acid and in column 1 of Table I, the letter D represents a polymer as prepared in Example V. In column 1 of Table I, PHEMA is polyhydroxyethyl methacrylate contact lens material.

Column 2 of Table I shows the percent of siloxane monomer present and the percent of PHEMA and D material.

Column 4 of Table I represents the amount f isocbornylacrylate present. Column 6 of Table I represents the amount of acrylic acid present.

Column 7 shows tensile strength in buffered form which was measured using ASTM D1708. Tensile strength is measured in g/mm². Column 8 shows the tensile modulus which is measured by ASTM D1708 and is measured in g/mm².

Column 9 of Table I is percent elongation. This is measured by ASTM D1708.

Columns 10 and 11 of Table I show tear strength. Tear strength is measured in g/mm thickness. Initial tear strength is shown in column 10 and tear strength after the tear begins is shown in column 11. The initial tear strength represents a certain force which starts the tear. However, it takes less tear force to keep the tear moving. Therefore, the number in column 11 is a propagation force, i.e., the force necessary to keep the tear going. The tear tests were conducted in accordance with ASTM 1938.

again another measure of tear strength which is shown in g/mm thickness.

Column 13 of Table I represents oxygen permeability in the buffered form. This oxygen permeability was determined by the following technique. The test is measuring the oxygen permeability of a material while it is wet with the buffered saline solution. This is an attempt to simulate the conditions of a contact lens when on the human eye. Two chambers filled with buffered saline at 32° C. are connected together by common passageway. Across this passageway is placed the material to be tested. The oxygen concentration in the first chamber is lowered by bubbling nitrogen gas into the second chamber until the oxygen concentration in the first chamber is below about 0.1 ppm. Aerated buffered saline (oxygen concentration about 8 ppm) is introduced into the second chamber. There is located in the first chamber an oxygen sensing electrode which measures the oxygen concentration in the first chamber. This measures the oxygen permeability of the material covering the passageway between the two chambers. The oxygen permeability of the sample can be calculated from the rate of oxygen concentration change in the first chamber. The unit of oxygen permeability is:

$$\frac{cc. (STP) \; cm}{sec. \; cm^2 \; mmHg}$$

Column 14 shows how many times more oxygen permeable the instant material is than the control material PHEMA polyhydroxyethylmethacrylate, i.e., HEMA hydrogel.

Most importantly, column 15 of Table I shows the percentage of water by weight based on the total weight of the water plus polymer contained in the material.

Column 16 of Table I shows the percentage of water by weight based on the total weight of the polymer contained in the material. This test is conducted by first using a buffering procedure. This procedure consists of placing the film to be tested which is about 2"×3" in size into 100 cc of 0.1 N ammonium hydroxide for 24 hours. Then the film is soaked in an isotonic phosphate buffer (ph 7.2), i.e., $Na_2HPO_4$, $NaH_2PO_4$ and NaCl, for another 24 hours. This buffered saline solution is made by mixing 1.403 g of $Na_2HPO_4$, 0.458 g of $NaH_2PO_4$ and 8.0 g of NaCl with water to make a final volume of one liter. The film is then stored in an isotonic buffered saline solution (ph 7.2).

The test procedure for determining the percent of water in the film is as follows. A sample about 0.3 grams in weight is taken from the above hydrated film. The film is roller dried and immediately weighed to the nearest milligram. The weighed film is placed into a vacuum oven. A vacuum is drawn to about 1 centimeter Hg. The sample is maintained at a temperature of about 80° C. overnight. The next day the material is cooled and the vacuum broken by admitting dried air. After the sample is at room temperature for about 15 minutes the sample is weighed to the nearest milligram.

The percent of water is calculated as follows for column 15:

$$\text{Percent water} = \frac{\text{wet weight} - \text{dry weight}}{\text{wet weight}} \times 100$$

The percent of water is calculated as follows for column 16:

$$\text{Percent water} = \frac{\text{wet weight} - \text{dry weight}}{\text{dry weight}} \times 100$$

Column 17 represents the transparency of the film. By the term "clear", we mean the film is at least substantially transparent with no opaqueness. By the term hazy, we mean the film may have a slight opaqueness.

As illustrated in Table I, it is one purpose of the instant invention to increase the percent of water absorbed by the lens while retaining high tensile strength, percent of elongation and, most importantly, retaining sufficient oxygen permeability. One problem with the prior art silicone polymers is that contact lenses made from this prior art material tend to stick to the eye and cause damage to the cornea. The absorption of water by the instant polysiloxane polymer has helped overcome this problem. Another problem with the prior art silixone polymers when used to make contact lenses is that these prior art polymers are not very strong and have poor tear strength and poor tensile strength. The instant material has a high tear and tensile stength. Also one problem with the PHEMA (control) is that contact lenses made from this material do not have the necessary oxygen transporting properties to meet all the oxygen requirements of the human cornea. As mentioned, oxygen requirement of the human cornea is about $2 \times 10^{-6}$ $cm^3/(sec.cm^2 atm.)$. Table I illustrates the effect the instant copolymers have on the percent of water absorbed by the copolymers and polymers.

In the case of modulus, it would be most preferred if the modulus is below 500 in order to obtain a soft contact lens. Therefore, generally the lower the modulus the softer the contact lens.

As to elongation, it is generally preferred that elongation be high.

As to oxygen transport, it is desirable that this rate be maximized. This rate should be greater than the rate of oxygen required for the human cornea.

The tensile strength test, the modulus test and elongation tests are measured, as mentioned, on an Instron Tester ASTM D1708 using standard "dog bone" samples at a speed of 0.25 inches per minute.

EXAMPLE VII 72.7 parts of the monomer as prepared in Example III is mixed with 18.2 parts of isobornylacrylate (IBA) and 9.1 parts of acrylic acid and 1 part of diethoxy acetophenone. About 30 μl of the mixture is placed in a spinning contact lens mold under $N_2$ atmosphere. After 2 hours irradiation with UV light, a cured contact lens is obtained. The lens formed is water absorbing, hydrophilic, optically clear, elastic and strong.

EXAMPLE VIII

30 μl of the fluid product, as prepared in Example VII, is placed in a suitable contact lens spin casting mold and spin cast under polymerizable conditions into a contact lens such as taught in U.S. Pat. No. 3,408,429. The lens is water absorbing, hydrophilic, optically clear, elastic and strong.

We claim:

1. A soft, hydrophilic, water absorbing, flexible, fillerless, hydrolytically stable, biologically inert contact lens with the capability of transporting oxygen sufficiently to meet the requirements of the human cornea made from a polymer comprising polymerizing a polysiloxane monomer α,ω terminally bonded through divalent hydrocarbon groups to polymerizable, free radical polymerizably activated, unsaturated groups with from 1.0 weight percent to about 30.0 weight percent based on the total weight of the polymer of acrylic acid and 5.0 weight percent of about 50.0 weight percent based on the total weight of the polymer of a material selected from the group of a polycyclic ester of acrylic acid and a polycyclic ester of methacrylic acid forming a polymer in a crosslinked network, said polymer capable upon saturation with water of retaining from about 1 percent by weight to about 99 percent by weight, based on the total weight of the dry polymer, of water.

2. The contact lens according to claim 1 wherein the polycyclic ester of acrylic acid is selected from the group consisting of isobornyl acrylate, adamantanyl acrylate, dicyclopentadienyl acrylate and isopinocamphyl acrylate.

3. The contact lens according to claim 2 wherein the polycyclic ester of acrylic acid is isobornyl acrylate.

4. The contact lens according to claim 1 wherein acrylic acid is present in amounts from about 5.0 weight percent to about 15.0 weight percent.

5. The contact lens according to claim 1 wherein the polycyclic ester of acrylic acid or methacrylic acid is present in amounts from about 10.0 weight percent to about 40.0 weight percent.

6. The contact lens according to claim 1 wherein the tensile modulus of elasticity is from about 50 $g/mm^2$ to about 8000 $g/mm^2$.

7. The contact lens according to claim 1 wherein the lens is substantially transparent.

8. The contact lens according to claim 1 wherein the polysiloxane monomer is selected from the group consisting of a poly(organosiloxane) monomer having the formula

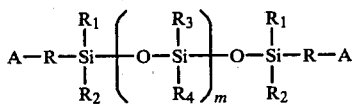

wherein A is an activated unsaturated group, R is a divalent hydrocarbon radical having from 1 to about 22 carbon atoms, $R_1$, $R_2$, $R_3$ and $R_4$ can be the same or different and is selected from the group consisting of a monovalent hydrocarbon radical or a halogen substituted monovalent hydrocarbon radical each having from 1 to 12 carbon atoms and m is 0 or greater and a polyparaffinpolysiloxane monomer having the formula

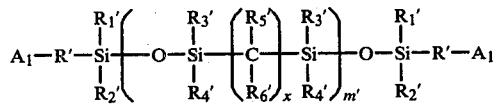

wherein $A_1$ is an activated unsaturated group; $R'$ is a divalent hydrocarbon radical having from 1 to about 22 carbon atoms; $R'_1$, $R'_2$, $R'_3$ and $R'_4$ can be the same or different and are selected from the group consisting of a monovalent hydrocarbon radical having from 1 to about 12 carbon atoms and a halogen substituted monovalent hydrocarbon radical having from 1 to about 12 carbon atoms; $R'_5$ and $R'_6$ can be the same or different and are selected from the group consisting of hydrogen, a hydrocarbon radical containing from 1 to about 12 carbon atoms, a carboxylic acid ester group represented by the formula

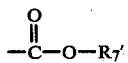

wherein $R'_7$ is selected from the group consisting of a hydrocarbon group containing from 1 to about 12 carbon atoms and a carboxylic acid amide represented by the formula

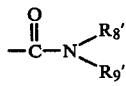

wherein $R'_8$ and $R'_9$ can be the same or different and each is selected from the group consisting of hydrogen and a hydrocarbon group containing from 1 to about 12 carbon atoms; x is 12 or greater and m' is 1 or greater.

9. The contact lens according to claim 8 wherein m is a number from 50 to about 800.

10. The contact lens according to claim 9 wherein m is a number of from about 50 to about 200.

11. The contact lens according to claim 10 which has a Shore hardness of 80 or below on the Shore hardness scale A.

12. The contact lens according to claim 11 which has a Shore hardness of 45 to 55 on the Shore hardness scale A.

13. The contact lens according to claim 8 which has an oxygen transportability of at least $2 \times 10^{-6}$ cm$^3$/(sec.cm$^2$atm.).

14. The contact lens according to claim 8 wherein A is selected from the group consisting of 2-cyanoacryloxy, acrylonitryl, acrylamido, acryloxy, methacryloxy, styryl, N-vinyl-pyrrolidinone-3-yl, N-vinyl-2-pyrrolidinone-4-yl and N-vinyl-2-pyrrolidinone-5-yl and R is an alkylene radical and $R_1$, $R_2$, $R_3$ and $R_4$ are alkyl radicals having from 1 to 10 carbon atoms.

15. The contact lens according to claim 14 wherein the alkylene radical has from about 1 to about 4 carbon atoms.

16. The contact lens according to claim 15 wherein the alkylene radical has from about 3 to about 4 carbon atoms.

17. The contact lens according to claim 8 wherein $R_1$, $R_2$, $R_3$ and $R_4$ are selected from the group consisting of a methyl radical and a phenyl radical.

18. The contact lens according to claim 17 wherein $R_1$, $R_2$, $R_3$ and $R_4$ are methyl radicals.

19. The contact lens according to claim 8 wherein m' is a number of from 1 to about 800.

20. The contact lens according to claim 19 wherein m' is a number from about 20 to 500.

21. The contact lens according to claim 20 wherein m' is a number of from about 20 to about 200.

22. The contact lens according to claim 8 wherein the oxygen transportability is at least $2 \times 10^{-6}$ cm$^3$/(sec.cm$^2$atm.).

23. The contact lens according to claim 22 which has a Shore hardness of 80 or below on the Shore hardness scale A.

24. The contact lens according to claim 8 wherein x is a number from 2 to 3.

25. The contact lens according to claim 8 wherein $A_1$ is selected from the group consisting of 2-cyanoacryloxy, acrylonitryl, acrylamido, acryloxy, methacryloxy, styryl, N-vinyl-2-pyrrolidinone-3-yl, N-vinyl-2-pyrrolidinone-5-yl and $R'$ is an alkylene radical and $R'_1$, $R'_2$, $R'_3$ and $R'_4$ are alkyl radicals having from 1 to 10carbon atoms.

26. The contact lens according to claim 25 wherein the alkylene radical has from about 1 to about 4 carbon atoms.

27. The contact lens according to claim 26 wherein the alkylene radical has from about 3 to about 4 carbon atoms.

28. The contact lens according to claim 8 wherein $R'_1$, $R'_2$, $R'_3$ and $R'_4$ are selected from the group consisting of a methyl radical and a phenyl radical.

29. The contact lens according to claim 28 wherein $R'_1$, $R'_2$, $R'_3$ and $R'_4$ are methyl radicals.

30. The contact lens according to claim 29 wherein $R'_5$ and $R'_6$ are selected from the group consisting of hydrogen and methyl.

31. The contact lens according to claim 30 wherein x is a number from 2 to 3.

* * * * *